Figure 1:
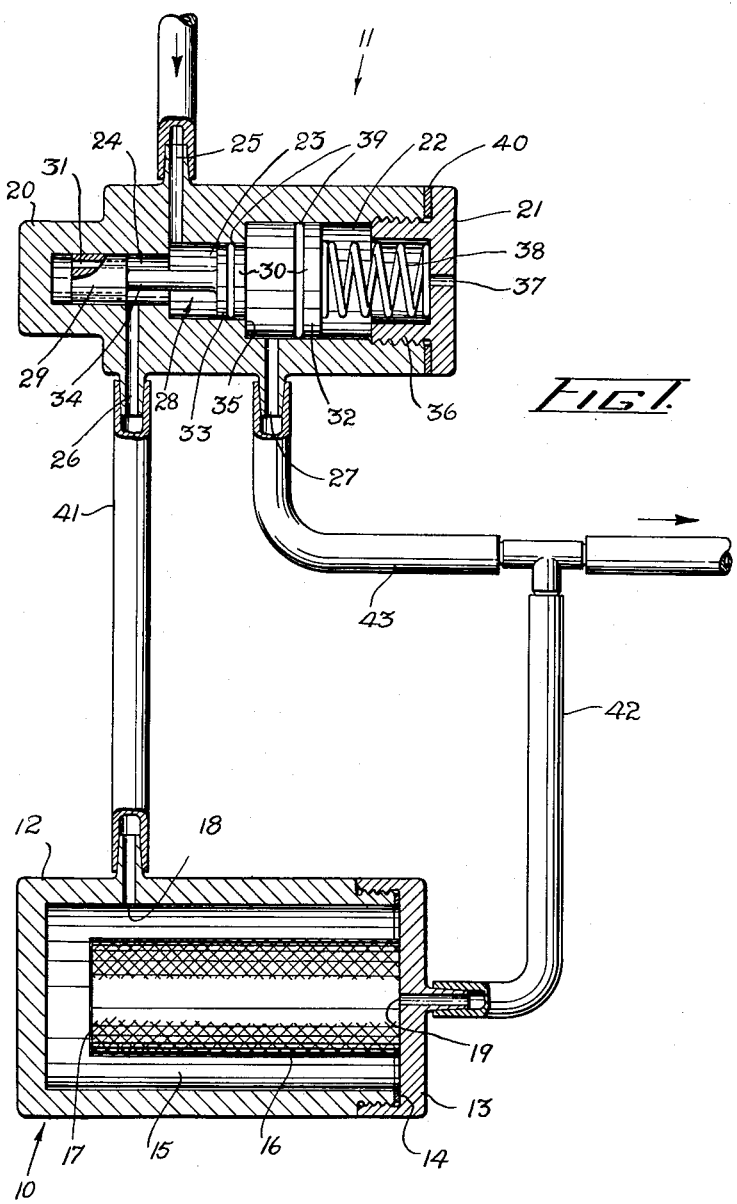

June 5, 1956 K. W. JAY 2,748,947
FILTER BY-PASS CONTROL

Filed Nov. 10, 1951 2 Sheets-Sheet 1

INVENTOR
K.W. JAY
PER

ATTORNEY

June 5, 1956 K. W. JAY 2,748,947
FILTER BY-PASS CONTROL
Filed Nov. 10, 1951 2 Sheets-Sheet 2

INVENTOR
K. W. JAY
PER
Garth E. Maybee
ATTORNEY

United States Patent Office 2,748,947
Patented June 5, 1956

2,748,947
FILTER BY-PASS CONTROL

Kenneth William Jay, Weston, Ontario, Canada, assignor to A. V. Roe Canada Limited, Malton, Ontario, Canada, a corporation Application November 10, 1951, Serial No. 255,770

14 Claims. (Cl. 210—166)

This invention relates to fluid filtering systems for aircraft and more particularly it relates to a by-pass control for such systems.

Filters are customarily employed in the lubrication and fuel systems of aircraft engines in order to prevent particles of foreign matter from being carried into the working parts of the engine and causing damage. These filters normally take the form of a fine-mesh screen spanning the supply line at some point so that foreign matter will be collected on the surface of the screen. After long periods of operation, however, these filters become clogged, and unless they are removed, cleaned or by-passed the flow of fluid in the system concerned is cut off. A similar condition can arise at very low temperatures due to the formation of ice on the filter or due to the fluid becoming too sluggish to permit adequate flow through the filter.

It is standard practice to counteract the clogging of a filter by providing a filter by-pass in the system. A by-pass control brings this by-pass into operation automatically in the event of clogging of the filter, thus ensuring that the supply of fluid to the engine is maintained.

Many filter by-pass controls operate satisfactorily in only one position, relying upon the force of gravity to prevent any foreign matter that has collected on the filter screen from being entrained in the fluid which is being by-passed and carried into the engine. In an aircraft installation, however, gravity force can not be utilized for this purpose since its line of action relative to the aircraft may be changed or even reversed during maneuvering of the aircraft.

It is a main object of this invention, therefore, to provide a filtering system wherein fluid which is by-passed does not entrain foreign matter from the filter.

It is a further object of the invention to provide a by-pass control whereby flow through the filter is automatically reinstated if the clogged condition of the filter is mitigated.

Figure 2:
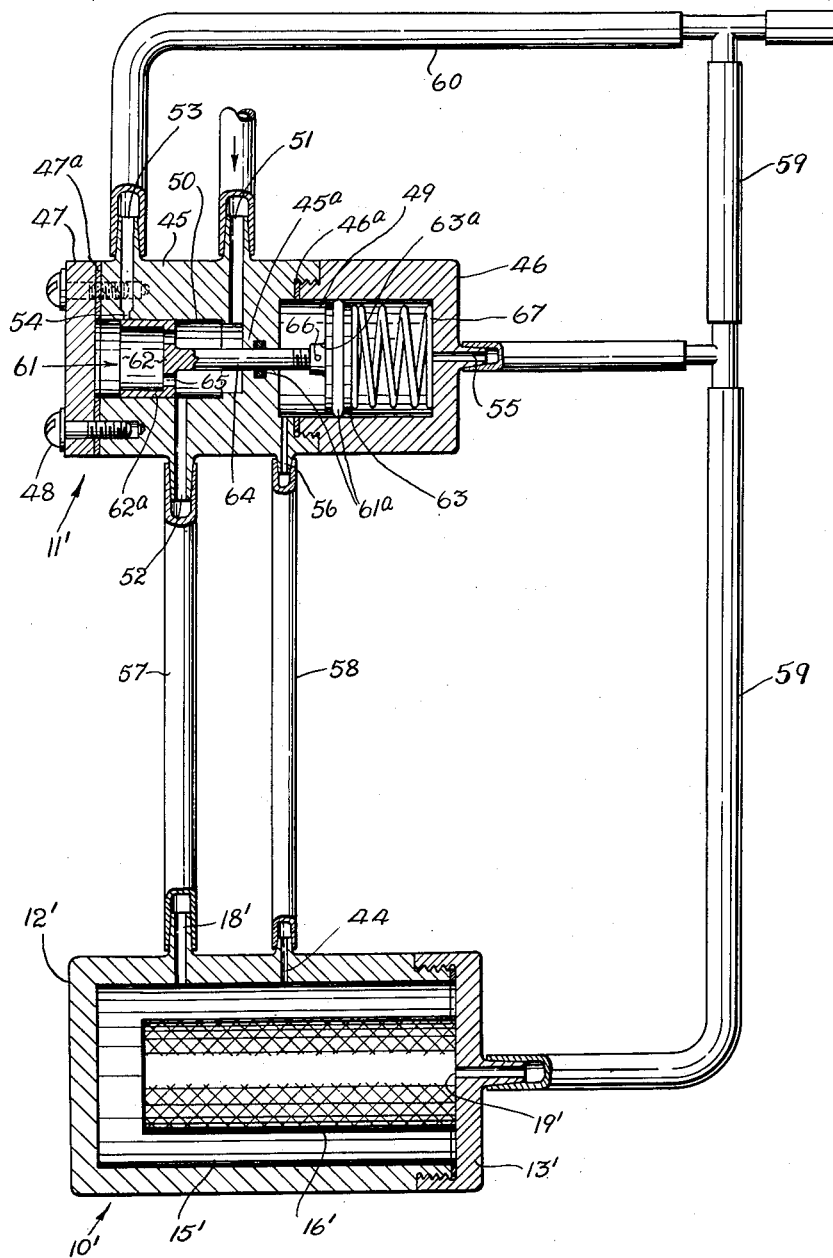

The invention will be more readily understood by reference to the accompanying drawings which form a part of this specification in which like reference characters indicate corresponding parts in the different views and in which:

Figure 1 is a sectional view of a filter connected to a filter by-pass control constructed in accordance with the invention; and Figure 2 is a similar view of an alternative form of the invention.

Referring now to the drawings, the filtering system shown in Figure 1 comprises a conventional filter 10 and a filter by-pass control 11. The filter consists of a hollow cylindrical casing 12 which has a cap 13 threaded onto one end, a sealing gasket 14 being inserted between the cap and the casing to prevent leakage. The inner walls of the casing define a filter chamber 15. A filter element 16, consisting of a cylinder of fine-mesh screening, is mounted at one of its ends on the cap 13 and extends into the chamber 15 co-axially therewith, the other end of the filter element being closed by a plate 17. An intake port 18 is provided in the cylindrical wall of the casing 12, and an outlet port 19 is provided in the cap 13 to communicate with the interior of the filter element. The interior of the filter element thus constitutes the outlet side of the filter, and the remainder of the chamber 15 constitutes the intake side of the filter.

The filter by-pass control 11 likewise consists of a hollow casing 20 having a cap 21. The inner walls of the casing define a stepped working chamber constituting a first cylinder 22, a second or intermediate cylinder 23 and a third cylinder 24; these cylinders are co-axial and are successively smaller in cross-sectional area. An inlet 25 for fluid leads to the intermediate cylinder 23; a filter supply outlet 26 leads from the third cylinder 24 and constitutes filter connection means whereby fluid is supplied to the filter; and a by-pass outlet 27 leads from the first cylinder 22, constituting by-pass connection means for the control. A reciprocable slidable member 28 is slidably mounted within the working chamber, the member 28 having piston components consisting of a small piston or valve 29 and a large piston 30. The small piston is cylindrical in shape and of such a diameter that it fits snugly within the third cylinder 24; longitudinal passages 31 through the piston serve to balance fluid pressures on opposite sides of the piston. The large piston is also cylindrical but it is formed with a step which divides the piston into a first component 32 and a second component 33 having diameters corresponding to the diameters of the first cylinder 22 and the second cylinder 23 respectively. A central shaft 34 forms a rigid connection between the small piston and the large piston. The disposition and arrangement of the member 28 and of the casing cylinders is such that when the member 28 is in the normal operating position shown in Figure 1, the step of the large piston is in juxtaposition to a corresponding step 35 between the first cylinder and the intermediate cylinder, the by-pass outlet 27 is obstructed by the first component 32 of the large piston, and the filter supply outlet 26 is unobstructed by the small piston.

The cap 21 of the filter by-pass control is threaded for engagement with the casing, the base of the cap being formed with a skirt 36 which extends into the first cylinder 22 to act as a stop for the base of the large piston. A bleed 37 is provided through the cap 21 to permit drainage of any fluid which may leak past the large piston, and a compression spring 38 is mounted in the first cylinder with one of its ends butting against the cap and the other against the large piston 30 to maintain the normal operating position shown in Figure 1. Seals 39 are provided in the first and second components 32 and 33 of the large piston in order to prevent leakage of fluid past the piston, and a gasket 40 is interposed between the base of the cap 21 and the end of the casing 20 to prevent leakage of fluid from the casing.

A filter supply line 41 connects the filter supply outlet 26 in the casing of the control to the intake port 18 in the filter casing. The outlet port 19 in the filter is connected by a drain line 42 to the outlet of the filtering system, and the by-pass outlet 27 of the control 11 is similarly connected by a by-pass 43 to the outlet of the filtering system.

Under normal operating conditions, fluid is supplied to the by-pass control 11 through the inlet 25, and passes through the intermediate cylinder 23, the filter supply outlet 26, and the filter supply line 41 to the filter 10. In the filter chamber, the fluid is forced through the fine-mesh screening of the filter element 16 and passes out of the filter by way of the outlet port 19. Any foreign particles entrained in the fluid will thus be caught by the screening of the filter element, being retained on the exterior surface thereof.

If the filter element becomes clogged so that fluid is prevented from passing through it, a back pressure will be created in the filter supply line 41 and in the intermediate cylinder 23. Since the compressive force exerted by the spring 38 is just sufficient to hold the piston assembly 28 in the normal position shown in Figure 1 under normal supply pressures, the additional back pressure acting on the crown or working face of the second component 33 of the large piston forces the piston assembly to the right. As soon as the crown of the second component of the large piston passes from the intermediate cylinder 23 into the first cylinder 22 an additional working area is presented by the crown of the first component 32 of the large piston, and the piston assembly 28 is moved rapidly over to the stop provided by the skirt 36 of the cap 21. As the piston assembly is moved over to the stop, the large piston 30 uncovers the by-pass outlet 27 and at the same time the small piston 29 covers the filter supply outlet 26, the cylindrical surfaces of the pistons thus serving as valves for the outlets 26, 27. As a result, fluid entering the inlet 25 is directed through the intermediate and first cylinders 23 and 22 to the by-pass outlet 27, and thence through the by-pass 43 to the outlet of the system. When the by-pass outlet is opened, the back pressure from the filter is removed, but the piston assembly is not restored by the spring 38 to the position shown in Figure 1 because the normal fluid pressure of the system is now acting on the larger area presented by the crown of the first component 32 of the large piston. The crown of the component 32 thus serves as means for retaining the member 28 in filter by-passing position.

Figure 2 shows another embodiment of the control which is designed to re-connect the filter into the system if the clogged condition of the filter is relieved. A filter 10' for use with the control is the same as the filter previously described except that an additional passage 44 is provided in the casing 12' to give access to the filter chamber 15'. As before there are intake and outlet ports 18' and 19' in the casing 12' and in the cap 13' respectively, and a filter element 16' is disposed co-axially within the casing.

The filter by-pass control 11' comprises a hollow casing 45, the casing being closed at one of its ends by a threaded cap 46 and at the other end by a cap 47 held in place by screws 48; gaskets 46ª and 47ª are inserted between the caps and the casing to prevent the escape of fluid. The casing is formed with an internal collar 45ª which divides the interior of the casing into two co-axial cylindrical chambers constituting a first cylinder 49 and a second cylinder 50, which, in the embodiment shown, is smaller than the first. An inlet 51 leads to the second cylinder and a filter supply outlet 52 and a by-pass outlet 53 drain it. A metering orifice 54 is provided in the mouth of the by-pass outlet. The first cylinder 49 has a port 55 in the cap 46 and another port 56 in its cylindrical wall adjacent the collar 45ª. A filter supply line 57 and a pressure-balancing line 58 connect the filter supply outlet 52 and the port 56 to the inlet port 18' and the passage 44 of the filter, respectively, so that the outlet 52 and port 56 may be designated as filter connection means for the control 11'. Similarly, the by-pass outlet 53 constitutes by-pass connection means for the control. A drain line 59 links the outlet port 19' of the filter chamber to the port 55 in the cap 46 and to the outlet of the system. A by-pass 60 connects the by-pass outlet 53 to the outlet of the system.

A reciprocable slidable member 61 is slidably mounted within the casing 45, the member having components consisting of a small piston or valve 62, a large piston 63, and a shank 64 which joins the two together. The small and large pistons and the shank fit sealingly within the second and first cylinders and the collar 45ª respectively, and seals 61ª are mounted in the large piston and in the collar to prevent leakage of the fluid.

The small piston 62 is formed with a skirt 62ª, and longitudinal passages 65 extend through the body of the piston. The shank 64 is threaded into an internally threaded boss 63ª on the large piston 63, and a pin 66 is secured transversely through the shank and the boss to prevent relative rotation of the pistons after assembly. A compression spring 67 is mounted in the first cylinder 49 with one of its ends butting against the cap 46 and its other end butting against the base of the large piston 63.

When the system is in normal operation, the member 61 takes up the position shown in Figure 2. Fluid enters the control 11' by way of the inlet 51 and passes through the second cylinder 50, the filter supply outlet 52 and the filter supply line 57 to the filter 10'. Foreign particles entrained in the fluid are separated by the filter element 16', and the fluid passes through to the outlet port 19' and thence to the outlet of the system.

The pressure-balancing line 58 and the drain line 59 transmit the pressures obtaining on the opposite sides of the filter element to the left- and right-hand sides (or working surfaces) respectively of the large piston 63 in the first cylinder 49. Since there is ordinarily little drop in pressure as the fluid passes through the filter element, the pressures in the first cylinder will be approximately the same on either side of the large piston. With the member 61 in the position shown in Figure 2, the compression spring 67 is exerting no force on the member.

If the filter element becomes clogged a back pressure is built up in the filter chamber 15' and this pressure is transmitted to the left-hand side of the large piston 63 by the pressure-balancing line 58. Since the pressure on the right-hand side of the large piston remains constant at its previous lower value, the member 61 is moved to the right, compressing the spring 67 and simultaneously covering the filter supply outlet 52 and uncovering the metering orifice 54 in the by-pass outlet.

Fluid entering the control now passes through the second cylinder 50 and the passages 65 into the by-pass outlet 53. The metering orifice 54 in the by-pass outlet ensures a pressure drop as the fluid passes into the by-pass 60 so that when the by-pass is in use a lower pressure exists on the right-hand side of the large piston 63 than on the left-hand side of the piston; thus the member 61 obstructs the filter connection means from communication with the inlet 51 and directs fluid to the by-pass connection means so long as the filter element 16' is clogged, the connecting means which transmit the pressure in the intake side of the filter and the pressure in the outlet of the system to opposite sides of the piston 63 constituting means for retaining the member 61 in filter by-passing position.

If the clogging of the filter element is mitigated, as may occur with a temperature rise in a case where there has been icing of the filter element, the back pressure in the filter chamber 15' is relieved so that the pressure on either side of the large piston 63 is equalized again. With this equalization in pressure, the force exerted by the compression spring 67 on the member 61 is sufficient to return the member to its original or normal position, uncovering the filter supply outlet 52 and obstructing the by-pass outlet 53 so that normal flow through the filter unit 10' is reinstated.

It will be seen that in both of the embodiments which have been illustrated, the by-pass control isolates the filter when the filter is clogged so that not only is the filter by-passed by the fluid, but it is also shut off, by valve means, from communication with the inlet and the by-pass connection means of the control, so that the fluid which is by-passed does not entrain any foreign matter that has collected in the filter.

It is to be understood that the forms of the invention herewith shown and described are to be taken as preferred examples of the same and that various changes may be made in the shape, size and arrangement of the parts without departing from the spirit of the invention or the scope of the subjoined claims.

In the claims the term "working face" is used to denote a piston face upon which fluid may, due to its pressure on the face, exert a force on the piston in a direction in which the piston can move, without at the same time exerting an equal force on the piston in the opposite direction. Thus, in Fig. 1, the working faces of the piston 30 are the vertical faces at the left-hand sides of the components 32 and 33; in Fig. 2 both vertical faces of the piston 63 are working faces, the pressure differential across the piston (and thus across the filter) determining the position of the piston.

What I claim as my invention is:

1. A control for regulating the flow of fluid to a filter and a by-pass, the control comprising a first hollow cylinder and a second hollow cylinder sealed from the first, a piston in the first cylinder, filter connection means communicating with the first cylinder on one side of the piston, the piston thereby being movable in response to fluid pressure in the filter connection means, an inlet for admitting fluid to the second cylinder, the filter connection means normally communicating with the second cylinder whereby fluid is delivered to the filter, by-pass connection means in the walls of the second cylinder, and a valve in the second cylinder normally obstructing the by-pass connection means from communication with the second cylinder, the valve being movable with the piston to open the by-pass connection means to communication with the second cylinder and obstruct the filter connection means from communication with the second cylinder.

2. A control for regulating the flow of fluid to a filter and a by-pass, the control comprising a first hollow cylinder and a second hollow cylinder sealed from the first, a piston in the first cylinder, filter connection means communicating with the first cylinder on one side of the piston, the piston thereby being movable in response to fluid pressure in the filter connection means, spring means opposing such movement of the piston, an inlet for admitting fluid to the second cylinder, the filter connection means normally communicating with the second cylinder whereby fluid is delivered to the filter, by-pass connection means in the walls of the second cylinder, and a valve in the second cylinder normally obstructing the by-pass connection means from communication with the second cylinder, the valve being movable with the piston to open the by-pass connection means to communication with the second cylinder and obstruct the filter connection means from communication with the second cylinder.

3. A control for regulating the flow of fluid to a filter having an intake side and an outlet side and to a by-pass for the filter, the control comprising a first hollow cylinder and a second hollow cylinder sealed from the first, a piston in the first cylinder, a port in the first cylinder on one side of the piston for connection to the by-pass and to the outlet side of the filter, filter connection means for connecting the first cylinder on the other side of the piston to the intake side of the filter, the piston thereby being movable in response to a difference in fluid pressure in the intake and outlet sides of the filter, an inlet for admitting fluid to the second cylinder, the filter connection means normally communicating with the second cylinder whereby fluid is delivered to the filter, by-pass connection means in the walls of the second cylinder, and a valve in the second cylinder normally obstructing the by-pass connection means from communication with the second cylinder, the valve being movable with the piston to open the by-pass connection means to communication with the second cylinder and obstruct the filter connection means from communication with the second cylinder.

4. A control for regulating the flow of fluid to a filter having an intake side and an outlet side and to a by-pass for the filter, the control comprising a first hollow cylinder and a second hollow cylinder sealed from the first, a piston in the first cylinder, a port communicating with the first cylinder on one side of the piston for connection to the by-pass, and to the outlet side of the filter, filter connection means for connecting the first cylinder on the other side of the piston, to the intake side of the filter, the piston thereby being movable in response to a difference in fluid pressure in the intake and outlet sides of the filter, spring means opposing such movement of the piston, an inlet for admitting fluid to the second cylinder, the filter connection means normally communicating with the second cylinder whereby fluid is delivered to the filter, by-pass connection means in the walls of the second cylinder, pressure reducing means in the by-pass connection means, and a valve in the second cylinder normally obstructing the by-pass connection means from communication with the second cylinder, the valve being movable with the piston to open the by-pass connection means to communication with the second cylinder and obstruct the filter connection means from communication with the second cylinder.

5. A control for regulating the flow of fluid to a filter and a by-pass, the control comprising a first hollow cylinder and a second hollow cylinder sealed from the first, a piston in the first cylinder, filter connection means communicating with the first cylinder on one side of the piston, the piston thereby being movable in response to fluid pressure in the filter connection means, an inlet for admitting fluid to the second cylinder, the filter connection means normally communicating with the second cylinder whereby fluid is delivered to the filter, by-pass connection means in the walls of the second cylinder, a second piston in the second cylinder, said second piston having a passage therethrough and normally obstructing the by-pass connection means from communication with the second cylinder, and a shaft connecting the pistons, said second piston thereby being movable with the first-mentioned piston to open the by-pass connection means to communication with the second cylinder and obstruct the filter connection means from communication with the second cylinder.

6. A control for regulating the flow of fluid to a filter having an intake side and an outlet side and to a by-pass for the filter, the control comprising an inlet for fluid, filter connection means for connecting the control to the intake side of the filter, said connection means normally communicating with the inlet whereby fluid is delivered from the inlet to the intake side of the filter, by-pass connection means, a piston movable from a normal position to another position, and piston operated valve means operable by the piston when it moves, the valve means obstructing the by-pass connection means from communication with the inlet in the normal position of the piston, the piston having a working face in communication with the filter connection means in the normal position of the piston whereby the piston is movable to said other position in response to predetermined fluid pressure on said face due to clogging of the filter, the valve means in said other position of the piston opening the by-pass connection means to communication with the inlet and obstructing the filter connection means from communication with the inlet to isolate the intake side of the filter from the inlet, and means for retaining the piston in said other position while the filter remains clogged.

7. A control as claimed in claim 6, in which said piston has another working face in communication with said outlet side of the filter whereby the piston is movable in response to a pressure differential across the filter.

8. A control as claimed in claim 6 and including a casing having walls defining a first cylinder and a second cylinder of smaller cross-sectional area than the first and substantially coaxial therewith, the cylinders comprising a stepped working chamber, said inlet being to the second cylinder and said filter connection means normally communicating with the second cylinder, said piston and said valve means being constituted by a slidable member movable from said normal to said other position, the slidable member having a first, a second, and a third component, the first component being slidably mounted in the first cylinder, the second component being normally slidably mounted in the second cylinder and normally obstructing fluid flow from the second to the first cylinder, at least one of the first and second components normally obstructing the by-pass connection means from communication with the second cylinder, said working face being provided on the second component, movement of the slidable member to said other position withdrawing the second component from the second cylinder, permitting fluid flow from the second to the first cylinder, and opening the by-pass connection means to communication with the second cylinder, the second component having a working face which is subjected to fluid pressure as a result of said fluid flow to the first cylinder, and the third component being adapted to obstruct the filter connection means form communication with the second cylinder in said other position of the slidable member.

9. A control as claimed in claim 8 and including spring means for normally holding said slidable member in said normal position.

10. A control for regulating the flow of fluid to a filter having an intake side and an outlet side and to a by-pass for the filter, the control comprising an inlet for fluid, filter connection means for connecting the control to the intake side of the filter, said connection means normally communicating with the inlet whereby fluid is delivered from the inlet to the intake side of the filter, by-pass connection means, a member reciprocable between a normal position and another position, said member comprising valve means and a piston, the valve means obstructing the by-pass connection means from communication with the inlet in the normal position of said member, the piston having a working face in communication with the filter connection means in the normal position of said member whereby said member is movable to said other position in response to predetermined fluid pressure on said face due to clogging of the filter, the valve means in said other position opening the by-pass connection means to communication with the inlet and obstructing the filter connection means from communication with the inlet to isolate the intake side of the filter from the inlet, and means for retaining said member in said other position while the filter remains clogged.

11. A control for regulating the flow of fluid to a filter having an intake side and an outlet side and to a by-pass for the filter, the control comprising a casing having walls defining a working chamber, an inlet for admitting fluid to the working chamber, filter connection means in the walls of the casing for connecting the control to the intake side of the filter, said connection means normally communicating with the working chamber whereby fluid is delivered from the chamber to the intake side of the filter, by-pass connection means in the walls of the casing, a member slidable in the chamber between a normal position and another position, said member comprising valve means and a piston, the valve means obstructing the by-pass connection means from communication with the chamber in the normal position of said member, the piston having a working face in communication with the filter connection means in the normal position of said member whereby said member is movable to said other position in response to predetermined fluid pressure on said face due to clogging of the filter, the valve means in said other position opening the by-pass connection means to communication with the chamber and obstructing the filter connection means from communication with the chamber to isolate the intake side of the filter from the chamber, and means utilizing fluid pressure for retaining said member in said other position while the filter remains clogged.

12. A control as claimed in claim 11, in which said member is urged from said other position toward the normal position by a spring.

13. A control for regulating the flow of fluid to a filter having an intake side and an outlet side and to a by-pass for the filter, the control comprising a casing having walls defining in the interior of the casing a plurality of substantially co-axial cylinders, an inlet for admitting fluid to the interior of the casing, filter connection means in the walls of the casing for connecting the control to the intake side of the filter, said connection means normally communicating with the inlet through the interior of the casing whereby fluid is delivered from the inlet to the intake side of the filter, by-pass connection means in the walls of the casing, a member within the casing having components in the cylinders, the member being slidable between a normal position and another position, the components of the member constituting valve means and a piston, the valve means in the normal position obstructing the by-pass connection means from communication with the inlet through the interior of the casing, the piston having a working face in communication with the filter connection means through the interior of the casing in the normal position whereby said member is movable to said other position in response to predetermined fluid pressure on said face due to clogging of the filter, the valve means in said other position opening the by-pass connection means to communication with the inlet through the interior of the casing and obstructing the filter connection means from communication with the inlet through the interior of the casing to isolate the intake side of the filter from the inlet, and means for retaining said member in said other position while the filter remains clogged.

14. A control for regulating the flow of fluid to a filter having an intake side and an outlet side and to a by-pass for the filter, the control comprising an inlet for fluid, filter connection means for connecting the control to the intake side of the filter, said connection means normally communicating with the inlet whereby fluid is delivered from the inlet to the intake side of the filter, by-pass connection means, a piston movable from a normal position to another position, and piston operated valve means operable by the piston when it moves, the valve means obstructing the by-pass connection means from communication with the inlet in the normal position of the piston, the piston having a working face in communication with the filter connection means in the normal position of the piston whereby the piston is movable to said other position in response to predetermined fluid pressure on said face from the filter connection means due to clogging of the filter, the valve means in said other position of the piston opening the by-pass connection means to communication with the inlet and obstructing the filter connection means from communication with the inlet to isolate the intake side of the filter from the inlet, thus maintaining said predetermined pressure in the filter connection means while the filter remains clogged, means utilizing said predetermined pressure in the filter connection means for retaining the piston in said other position while said predetermined pressure exists in the filter connection means, and return means for restoring the piston to the normal position when said predetermined pressure in the filter connection means is relieved.

References Cited in the file of this patent

UNITED STATES PATENTS

| Number | Name | Date |
|---|---|---|
| 989,533 | Macduffe | Apr. 11, 1911 |
| 1,128,077 | Taylor | Feb. 9, 1915 |
| 1,613,467 | Liddell | Jan. 4, 1927 |
| 1,822,006 | Bull | Sept. 8, 1931 |
| 1,955,903 | Cammen | Apr. 24, 1934 |
| 2,056,756 | Wiedhofft | Oct. 6, 1936 |
| 2,544,244 | Vokes | Mar. 6, 1951 |
| 2,544,269 | Le Clair | Mar. 6, 1951 |
| 2,602,547 | Floss et al. | July 8, 1952 |